United States Patent
DeLine

(10) Patent No.: US 7,948,376 B2
(45) Date of Patent: May 24, 2011

(54) FUEL DISPENSER

(75) Inventor: Jonathan E. DeLine, Oak Ridge, NC (US)

(73) Assignee: Gilbarco Inc., Greensboro, NC (US)

( * ) Notice: Subject to any disclaimer, the term of this patent is extended or adjusted under 35 U.S.C. 154(b) by 254 days.

(21) Appl. No.: 12/190,820

(22) Filed: Aug. 13, 2008

(65) Prior Publication Data

US 2009/0048706 A1 Feb. 19, 2009

Related U.S. Application Data

(60) Provisional application No. 60/956,072, filed on Aug. 15, 2007.

(51) Int. Cl.
*G08B 21/00* (2006.01)
*B67D 7/12* (2010.01)
(52) U.S. Cl. .......................... 340/540; 222/74
(58) Field of Classification Search .................. 340/540; 222/74; 235/381; 705/16, 21
See application file for complete search history.

(56) References Cited

U.S. PATENT DOCUMENTS

| | | | |
|---|---|---|---|
| 5,134,716 A | 7/1992 | Craig | |
| 5,700,999 A | 12/1997 | Streicher et al. | |
| 5,913,180 A | 6/1999 | Ryan | |
| 6,070,156 A | 5/2000 | Hartsell, Jr. | |
| 6,098,879 A | 8/2000 | Terranova | |
| 6,116,505 A | 9/2000 | Withrow | |
| 6,323,846 B1 | 11/2001 | Westerman et al. | |
| 6,338,008 B1 | 1/2002 | Kohut et al. | |
| 6,493,440 B2 | 12/2002 | Gromatzky et al. | |
| 6,523,744 B2 * | 2/2003 | Royal et al. | 235/381 |
| 6,570,610 B1 | 5/2003 | Kipust | |
| 6,571,151 B1 | 5/2003 | Leatherman | |
| 6,611,252 B1 | 8/2003 | DuFaux | |
| 6,614,422 B1 | 9/2003 | Rafii | |
| 6,648,031 B1 | 11/2003 | Ambrose et al. | |
| 6,690,357 B1 | 2/2004 | Dunton | |
| 6,734,798 B2 | 5/2004 | Smith | |
| 6,899,151 B1 | 5/2005 | Latka et al. | |
| 6,957,673 B2 | 10/2005 | Ambrose et al. | |
| 7,030,861 B1 | 4/2006 | Westerman et al. | |
| 7,082,406 B1 * | 7/2006 | Dickson | 705/24 |
| 7,084,857 B2 | 8/2006 | Lieberman | |
| 7,167,917 B2 | 1/2007 | Creamer et al. | |
| 7,296,709 B1 * | 11/2007 | Anderson | 222/75 |
| 7,640,185 B1 * | 12/2009 | Giordano et al. | 705/23 |
| 2001/0044751 A1 | 11/2001 | Pugliese et al. | |
| 2003/0025600 A1 | 2/2003 | Blanchard | |
| 2003/0041330 A1 | 2/2003 | Smith | |

(Continued)

OTHER PUBLICATIONS

PCT International Search Report dated Nov. 24, 2008.

(Continued)

*Primary Examiner* — John A Tweel, Jr.
(74) *Attorney, Agent, or Firm* — Nelson Mullins Riley & Scarborough LLP

(57) ABSTRACT

A fuel dispenser comprising a housing, a fuel dispensing apparatus mounted within the housing, control electronics operatively connected to the fuel dispensing apparatus, at least one display mounted in the housing and operatively coupled to the control electronics, and a nozzle operatively coupled to the fuel dispensing apparatus and the fuel dispensing apparatus control electronics, the nozzle configured to produce electromagnetic signals. The dispenser is configured to trigger an alarm when the nozzle is brought into close proximity to the at least one display to prevent the user from using the nozzle to make data entries.

20 Claims, 12 Drawing Sheets

U.S. PATENT DOCUMENTS

| | | |
|---|---|---|
| 2003/0055727 A1 | 3/2003 | Walker et al. |
| 2003/0130891 A1 | 7/2003 | Jacobs |
| 2003/0130965 A1 | 7/2003 | Jacobs et al. |
| 2004/0256306 A1 | 12/2004 | Watanabe et al. |
| 2005/0000588 A1 | 1/2005 | Webb et al. |
| 2005/0023289 A1 | 2/2005 | Ambrose et al. |
| 2005/0167482 A1 | 8/2005 | Ramachandran et al. |
| 2006/0012479 A1 | 1/2006 | Ezra |
| 2006/0026521 A1 | 2/2006 | Hotelling et al. |
| 2006/0026536 A1 | 2/2006 | Hotelling et al. |
| 2006/0091201 A1 | 5/2006 | Simonson |
| 2006/0097991 A1 | 5/2006 | Hotelling et al. |
| 2006/0197753 A1 | 9/2006 | Hotelling |
| 2006/0277571 A1 | 12/2006 | Marks et al. |
| 2007/0177803 A1 | 8/2007 | Elias et al. |
| 2007/0177804 A1 | 8/2007 | Elias et al. |
| 2008/0040287 A1 | 2/2008 | Harrell et al. |
| 2009/0045978 A1 | 2/2009 | Weitzhandler et al. |
| 2009/0048706 A1 | 2/2009 | DeLine |
| 2009/0048707 A1 | 2/2009 | DeLine |
| 2009/0048708 A1 | 2/2009 | DeLine |
| 2009/0048709 A1 | 2/2009 | DeLine |
| 2009/0048710 A1 | 2/2009 | DeLine |
| 2009/0048711 A1 | 2/2009 | DeLine |
| 2009/0048945 A1 | 2/2009 | DeLine |

OTHER PUBLICATIONS

PCT Written Opinion dated Nov. 24, 2008.
Panphonics Audio Elements Manual v1.0/1-2008.
Panphonics Sound Shower Operation Manual v2.1.

* cited by examiner

FUEL DISPENSER

The present application claims priority to U.S. Provisional Patent Application Ser. No. 60/956,072, filed Aug. 15, 2007, entitled FUEL DISPENSER, the entire disclosure of which is incorporated by reference herein.

FIELD OF THE INVENTION

The present invention relates to dispensers and, more particularly, to fueling stations having advanced dispenser systems.

BACKGROUND OF THE INVENTION

In recent years, traditional fuel dispensers have evolved into elaborate point-of-sale (PoS) devices having sophisticated control electronics and user interfaces with larger displays and easier-to-use user interfaces. The fuel dispensers may include various types of payment means, such as card readers and cash acceptors, to expedite and further enhance fueling transactions. Further, customers are not limited to the purchase of fuel at these dispensers. Newer dispensers allow the customer to purchase services, such as car washes, and goods, such as fast food or convenience store products. Once purchased, the customer needs only pick up the goods and services at the station store or the outlet of a vending machine.

In addition to local transactions, various types of information services are being provided at the fuel dispenser. In particular, Internet-related services are now being provided at the fuel dispenser. These services range from allowing customers to view various web pages to obtain desired information to supplying predefined advertising information to the customer via local or remote content servers. Unfortunately, the vast majority of fuel dispensers already in existence include displays and associated input devices that are insufficient for supporting web-based interaction. Further, many of the fuel dispensers fail to include the necessary control electronics to readily support such interaction.

Retail sales systems must also provide convenience for the customer and efficiency for the retailer. Credit and debit cards provide retailers with one mechanism for increasing the efficiency of retail sales systems, while providing a level of convenience to consumers. Indeed, credit card and debit card transactions are ubiquitous, with a variety of retail equipment providing such capability. A given retailer or merchant is effectively obligated to provide credit transaction capability because it is so widely expected. A growing number of customers own cellular telephones and, in particular, own digital cellular telephones. Digital cellular telephones are distinguished from their earlier generation analog counterparts in a number of ways. One significant distinction of the newer digital cellular phones is their intrinsic communications security. As such, these digital cellular phones are suitable for use in transaction processing, wherein a customer may transmit certain information, including their PIN, to effect a given retail transaction. Further, using a customer's digital cellular telephone as an integral part of a retail transaction system is consistent with the desire to provide customers with ever more convenient retail transactions.

Accordingly, there is a need to provide retail systems capable of communicating certain transaction information to a cellular network for the purpose of obtaining transaction authorization, with such information sent through a customer cellular telephone.

Retail environments, such as gas stations and convenience stores, use fuel dispensers for completing transactions associated with purchases of goods and services. These fuel dispensers include user interfaces that allow customers to interact with the fuel dispensers. User interfaces at fuel dispensers typically include a display that provides a customer with information associated with a purchase transaction. This information can include an itemized listing of the products or services purchased and a total amount for the sale. The information presented can also include a prompt to the user for payment information. The prompt for payment information can include a request for account or other information required to complete the purchase transaction.

A customer interacts with the fuel terminal to initiate a transaction and to respond to information prompts using an input device, such as a touch screen, keypad, or pointing device. The input device provides the fuel dispenser with information from the customer that allows the fuel dispenser to process the transaction. This information is typically in the form of payment information, such as account information and personal identification numbers (PINs). Account number readers, such as card readers and interrogators, are used to retrieve some of the processing information, but PINs are usually entered manually by a user to ensure that the user is authorized to use the account information that is presented for payment.

However, fuel dispensers are typically open to view by bystanders. "Shoulder surfing" is a term that identifies a bystander that purposefully attempts to view the information on a display of a fuel dispenser or attempts to view a PIN entered on an input device by a customer of a fuel dispenser. Shoulder surfers can memorize the location of input keys and can easily interpret keystrokes at a fuel dispenser from a short distance without electronic equipment. Shoulder surfing has also become more advanced as perpetrators use binoculars and cameras in an attempt to obtain information about a customer's account without detection from more remote locations. By use of advanced surveillance equipment, shoulder surfers can obtain private information about customers of fuel dispensers virtually without detection. Shoulder surfing subjects customers of fuel dispensers to theft of identifying information associated with payment accounts and PINs.

Additionally, keypads of fuel dispensers wear out over time due to continuous and repeated action of their keys by customers. Conventional keypads are mechanical in nature. With use, the contacts within a keypad may also corrode and lose their conductivity. As such, fuel dispensers are plagued with a costly replacement schedule for user interface keypads. Accordingly, an approach for prevention of fraud at fuel dispensers is needed. Additionally, reduction in maintenance costs for user interface keypads of fuel dispensers is also needed.

Finally, prior art fuel dispensers include speakers that allow the user to hear advertisements and that also allow the attendant in the convenience store to speak to a customer. However, prior art speakers are loud and omni-directional so that sound from one dispenser interferes with sound generated from another dispenser. Therefore, a need exists for a dispenser that has a directional speaker that does not interfere with other customers at adjacent dispensers, and that also allows private communications to occur without others listening.

SUMMARY OF THE INVENTION

The present invention recognizes and addresses disadvantages of prior art constructions and methods, and it is an object of the present invention to provide a fuel dispenser comprising a housing, a fuel dispensing apparatus mounted within the housing, control electronics operatively connected to the fuel dispensing apparatus, at least one display mounted in the housing and operatively coupled to the control electronics, and a nozzle operatively coupled to the fuel dispensing apparatus and the fuel dispensing apparatus control electronics, the nozzle configured to produce electromagnetic signals. The dispenser is configured to trigger an alarm when the nozzle is brought into close proximity to the at least one display to prevent the user from using the nozzle to make data entries.

In some embodiments, a detector is mounted in the housing, is operatively coupled to the control electronics and is configured to detect the presence of the nozzle when the nozzle is brought into close proximity to the at least one display. In some embodiments, close proximity is within six inches of the at least one display. In other embodiments, the detector receives electromagnetic signals transmitted by the nozzle. In yet other embodiments, the display may contain touch electronics that are configured to detect the presence of the nozzle when the nozzle is brought into close proximity to the at least one display. In some embodiments, the display is turned off when the alarm is triggered. In other embodiments, the alarm further comprises an audible alarm.

In some embodiments, the nozzle further comprises a power source for generating the electromagnetic signals. In other embodiments, the power supply is charged when the nozzle is stored in the housing between dispensing transactions. In other embodiments, the nozzle contains an antimicrobial coating. In yet other embodiments, the at least one display is dynamically configurable to simultaneously display a combination of two or more of transaction data, advertising data, loyalty program data, an internet browser and a TV broadcast.

In another embodiment, a fuel dispenser comprises a housing, a fuel dispensing apparatus mounted within the housing, the fuel dispensing apparatus having control electronics, at least one touch display mounted in the housing and operatively coupled to the control electronics, the touch display being configured to allow a user to make inputs for conducting a transaction, a nozzle operatively coupled to the fuel dispensing apparatus, and a detector operatively configured to detect the nozzle. The fuel dispensing apparatus control electronics triggers an alarm when the nozzle is brought into close proximity to the touch display to prevent the user from contacting the at least one touch display with the nozzle.

In some embodiments, the nozzle contains an antimicrobial coating. In yet other embodiments, the alarm comprises the fuel dispenser apparatus control electronics causing the at least one touch display to blank out to prevent the user from making inputs using the nozzle. In some embodiments, the detector is a camera that generates images that are used to determine when the nozzle moves within a predetermined distance from the at least one touch display. In yet other embodiments, the at least one touch display is dynamically configurable to simultaneously display a combination of two or more of transaction data, advertising data, loyalty program data, an internet browser and a TV broadcast. In some embodiments, the camera is also used to track the approximate location of the user with respect to the fuel dispenser. In other embodiments, the camera captures an image of the user to determine the identity of the user. The user identity is used to configure the information and graphics presented on the at least one touch display. Where the configuration of information and graphics comprises at least one of changing a viewing angle of the display, changing a background color, changing a size of font, changing a polarization of the at least one touch display and changing a brightness of the at least one touch display.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
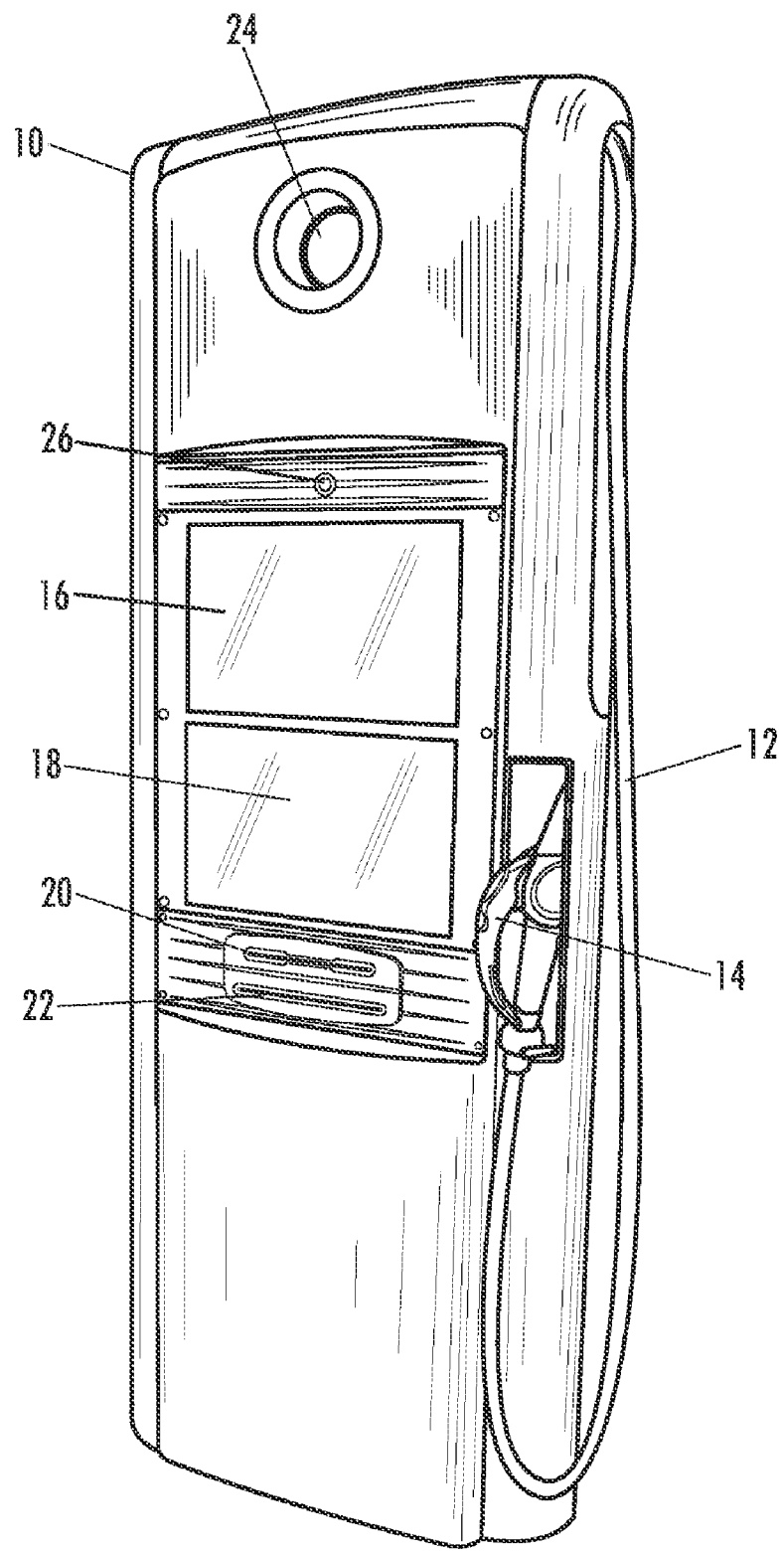
FIG. 1 is a perspective view of a fuel dispenser for use in an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations. Additional aspects and advantages of the invention will be set forth in part in the description which follows and, in part, will be obvious from the description, or may be learned by practice of the invention.

Figure 2:
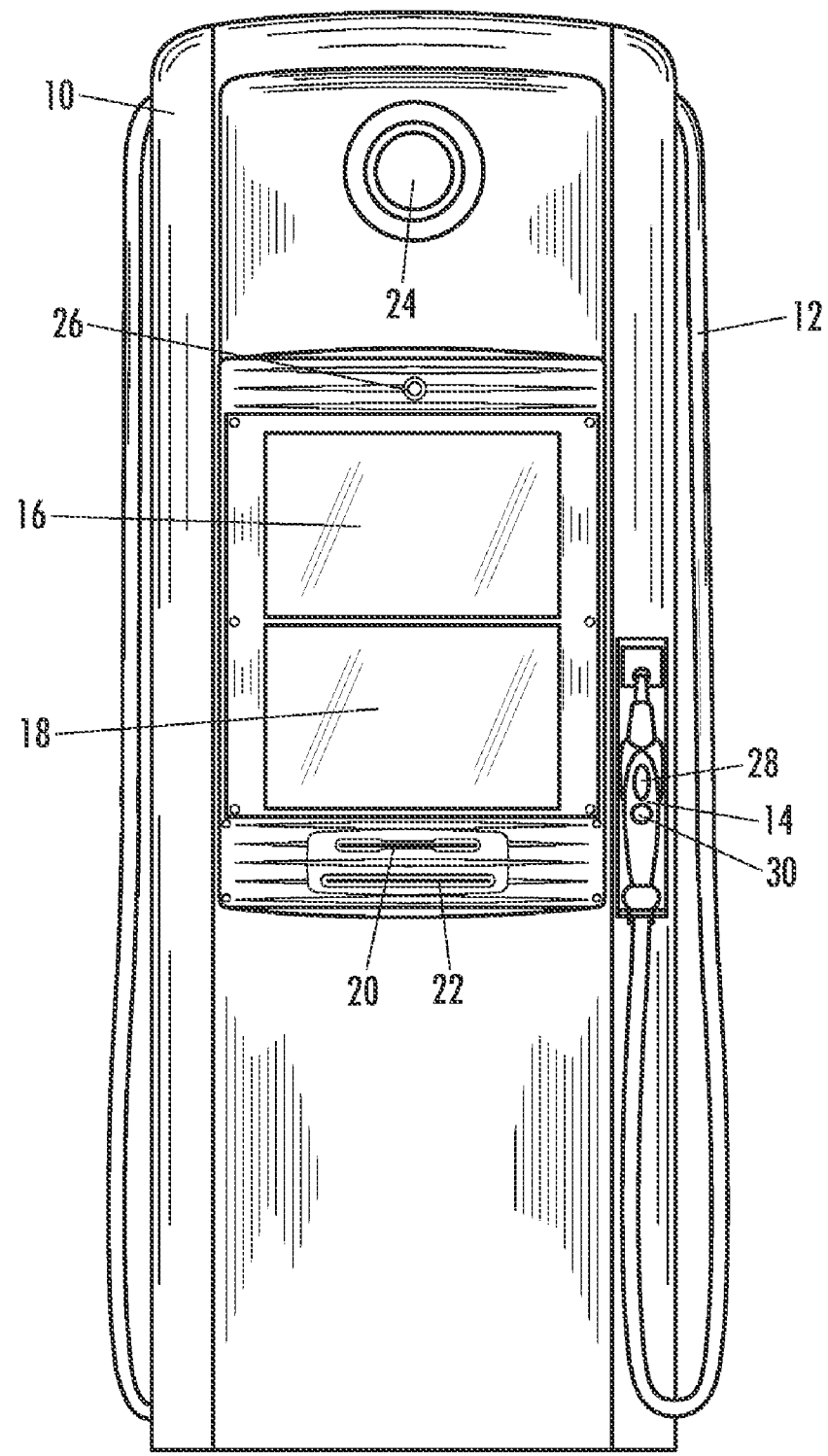
FIG. 2 is a front view of the fuel dispenser of FIG. 1.
Figure 3:
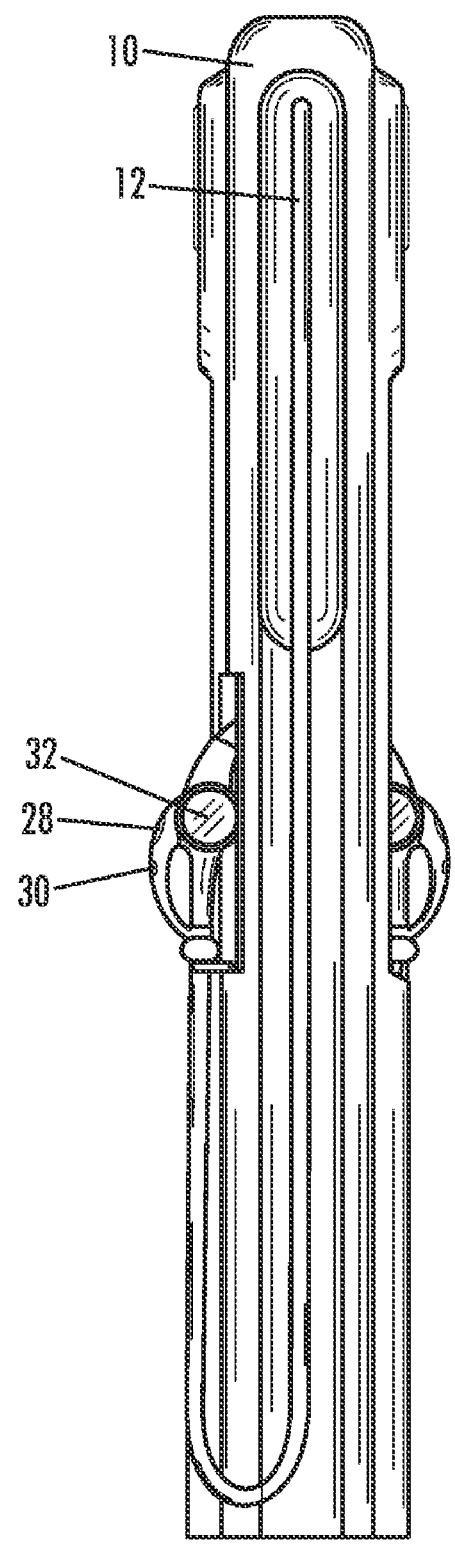
FIG. 3 is a side view of the fuel dispenser of FIG. 1.

Referring to FIGS. 1-3, a fuel dispenser 10 is shown having a generally rectangular body, a fuel supply line 12 and a fuel nozzle 14 received by a holder on the dispenser body and connected to fuel supply line 12. Fuel nozzle 14 may also be representative of multiple fuel nozzles all connected to the fuel dispenser. Dispenser 10 has a front side and a back side each being a duplicate of the other. In the following description of one preferred embodiment, only the front side will be discussed for ease of description. However, the features of the present invention may also be applied on the back side, thereby allowing the dispenser to be operated by two customers at the same time. It should also be understood that dispenser 10 may only have displays and hoses on a single side, where multiple dispensers are placed together to form a filling position. Thus, the following description is presented as one example and should not be interpreted as limiting the invention to a single embodiment.

The front side of dispenser 10 contains first and second display screens 16 and 18, which are configured to present information to the user of the system. First and second display screens 16 and 18 may be conventional liquid crystal displays ("LCD") and may include an associated key pad or soft buttons positioned adjacent to the displays. However, in one preferred embodiment, the screens will generally include an integrated touch interface. A reader 20 may be mounted below second screen 18 along with a full size printer 22. A camera 24 is positioned toward the top of dispenser 10 along with a speaker 26.

Figure 4:
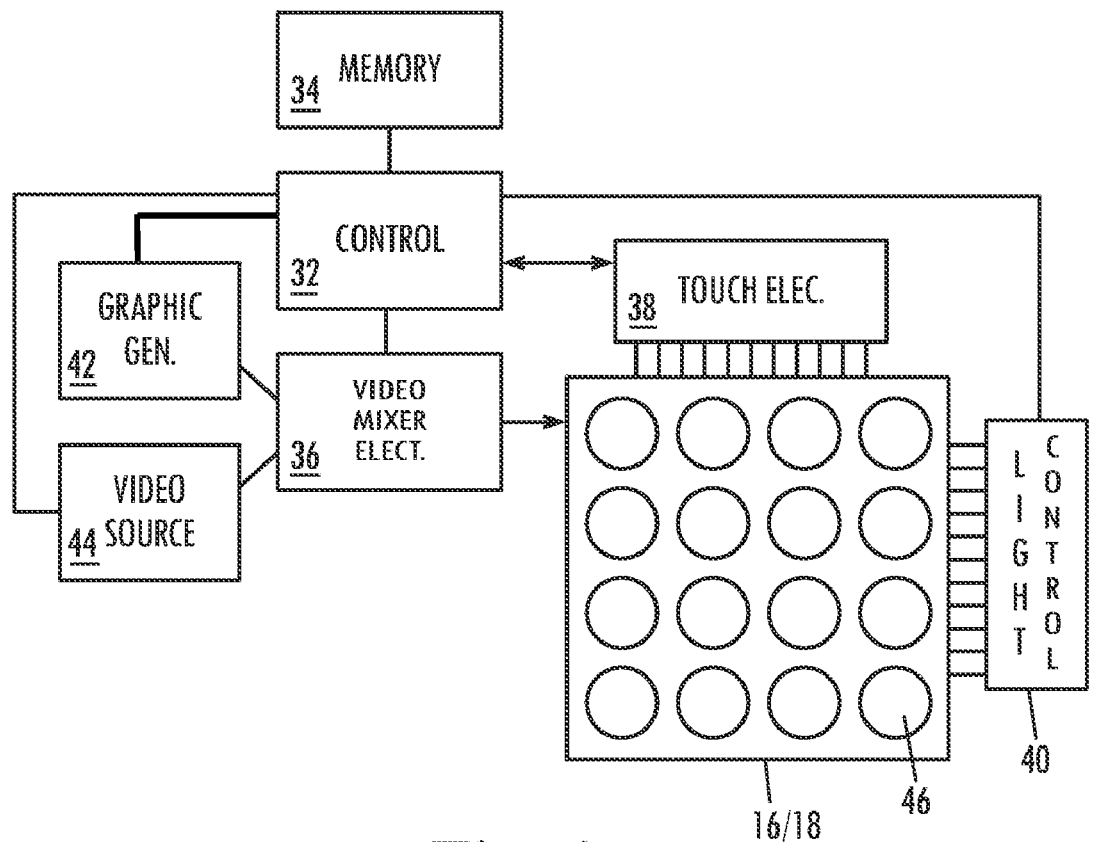
FIG. 4 is a schematic view of an embodiment of video electronics for use in the dispenser of FIG. 1.

Referring to FIG. 4, a schematic for a basic control system and touch screen display has a controller 32 coupled to memory 34, a video mixer and driver electronics 36, touch screen electronics 38, back-lighting control electronics 40, graphics generator 42 and a video source 44. Graphics generator 42 provides graphics for display on touch screen displays 16 and 18, and video source 44 provides running audio and/or video for displays 16 and 18. The video source may include, but is not limited to, laser disks, DVD's, television, cable TV, satellite TV, the Internet and video cameras. Touch screen electronics 38 typically provide signals to controller 20 indicative of where displays 16 and 18 have been touched in order to differentiate customer inputs and selections. Touch interfaces are well known, and manufactures of suitable touch displays include TouchSystems Corporation of Hutto, Tex. and CyberTouch of Newbury Park, Calif. It should be understood that the schematic shown in FIG. 4 is for illustrative purposes only and that other electronic layouts are contemplated by the present invention for carrying out the described functionality.

Displays 16 and 18 and touch screen electronics 38 may be configured to operate in a highly sensitive mode where the display and touch screen electronics are able to sense changes in a field emitted from displays 16 and 20 without requiring an actual touching of the display. Preferably, this field will extend up to several feet in front of the display over a respective fueling position in front of dispenser 10. In one preferred embodiment, displays 16 and 18 are capacitive touch screen displays capable of operating at various frequencies to provide various sensitivity levels, where increased frequencies typically provide higher sensitivity. An exemplary capacitive touch screen display is manufactured by Microtouch™ and can sense a customer coming within four (4) feet of the displays. Thus, in one preferred embodiment, controller 32 could increase the frequency and, therefore, the display's sensitivity between fueling operations in order to sense the approach and/or presence of a customer at the beginning of a new fueling operation. It should be understood that other suitable types of touch screen technology may be used for displays 16 and 18.

Controller 32 may be adapted to control display back-lighting 46 through back-lighting control electronics 40. Depending on the application, the back-lighting may be decreased from a nominal operating level or turned completely off between fueling operations, to reduce heat and conserve energy. Preferably, once a customer is detected within a relative proximity to the fuel dispenser, the back-lighting is increased or turned on to the normal operating level in order to make the display's content readily visible to the customer as well as draw the customer's attention to the displays.

One problem associated with touch screens at the dispenser occurs when the customer uses fueling nozzle 14 to make their selections on screen 16 and 18 by touching the tip of the nozzle to the touch screen. In order to prevent the customer from touching the screen with the fueling nozzle, displays 16 and 18, back light control electronics 40 or touch electronics 38 may be coupled to a sensor that detects the presence of a tag or associated electronics contained in nozzle 14. That is, when nozzle 14 is brought into close proximity to one of touch displays 16 and 18, controller 32 may cause the displays to go blank to discourage the customer from touching the screen with the nozzle. Other methods may be used to detect when a customer is bringing the nozzle into close proximity with one of the touch screens. For example, dispenser 10 may include an RFID reader and nozzle 14 may include an RFID tag. Whichever method is used, the end result should be to blank out one or both of displays 16 and 18 to dissuade the customer from touching the displays with the nozzle. In addition to, or instead of blanking out the screen, dispenser 10 may be programmed to play an audible alarm when nozzle 14 is brought into close proximity to displays 16 and 18.

Figure 5:
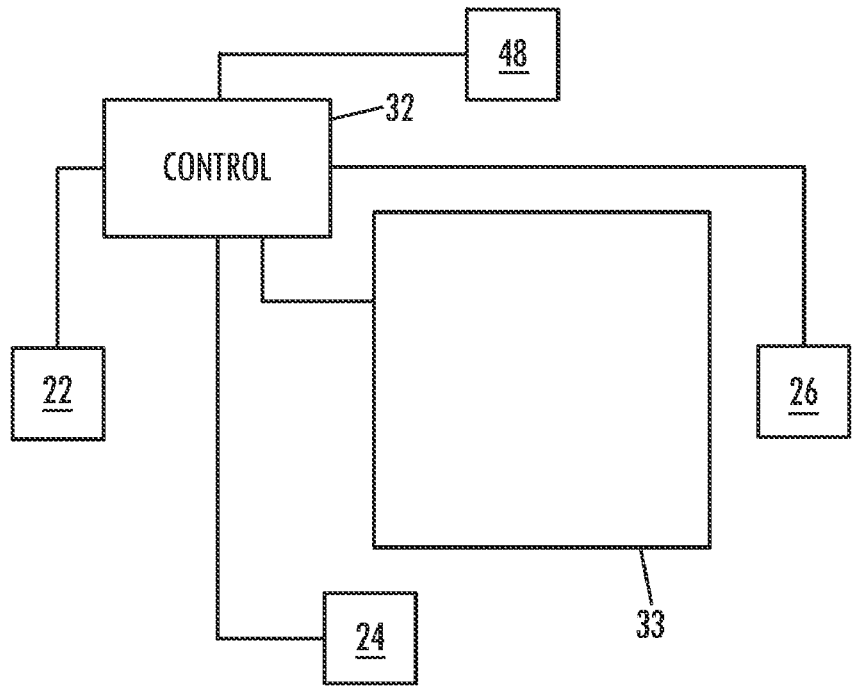
FIG. 5 is a schematic diagram of a controller for use in the dispenser of FIG. 1 connected to other peripheral devices.

Referring to FIG. 5, controller 32 may read data from reader 20, which may include one or more of a magnetic strip reader, an RFID tag reader, a finger print reader, a retina scanner or any other suitable data entry device, and communicate the information to a service-station-based controller, such as a G-site controller (not shown in the figure) sold by Gilbarco, Inc. of Greensboro, N.C. The service station based controller generally communicates with a remote credit card or other information verification authority to ascertain whether a transaction may be authorized. In one embodiment, controller 32 is comparable to the microprocessor based control systems used in CRIND (card reader in the dispenser) and TRIND (tag or transponder reader in the dispenser) type units sold by Gilbarco, Inc. under the trademark THE ADVANTAGE. However, it should be understood that controller 32 may be any type of controller suitable to carry out the functionality as described herein.

Controller 32 is also coupled to printer 22, which may be configured to print transaction information, unrelated fuel purchase information, map data, driving directions, and other information obtained by the user during the fueling process. Printer 22 may be a full sized laser printer, inkjet printer or other suitable black and white or color printer. The printer is positioned in dispenser 10 so that the output of the printer exits from the front side of the dispenser. Printer 22 may also be configured to print on various sized papers depending on the subject matter being printed, which may be sheet fed or roller fed.

Controller 32 may also be coupled to camera 24 located above displays 16 and 18 and speaker 26. Camera 24 may be used to detect the presences and identity of a customer, and may be used instead of, or in addition to, displays 16 and 18 and proximity sensor 48 for sensing the proximity of a user. Notably, when displays 16 and 18, camera 24 and a proximity sensor 48 are used, controller 32 may be configured to monitor the relative proximity of a customer measured by each of these components to determine the relative location of the customer with respect to the dispenser. This information may be used to control the viewing angle on displays 16 and 18 and/or to change fonts or text sizes accordingly to enhance visibility. In particular, the control system can determine when a customer was more proximate to the right of the displays and adjust the viewing angle of the display to better allow the customer to view the displays by changing font size, font type, brightness, polarization of the screen or by any other known methods of adjusting viewing angle of a display. Likewise, these components may be used to determine the height and other characteristics of the customer so that the vertical viewing angle of the display may be adjusted in accordance with the detected characteristics.

Figure 12:
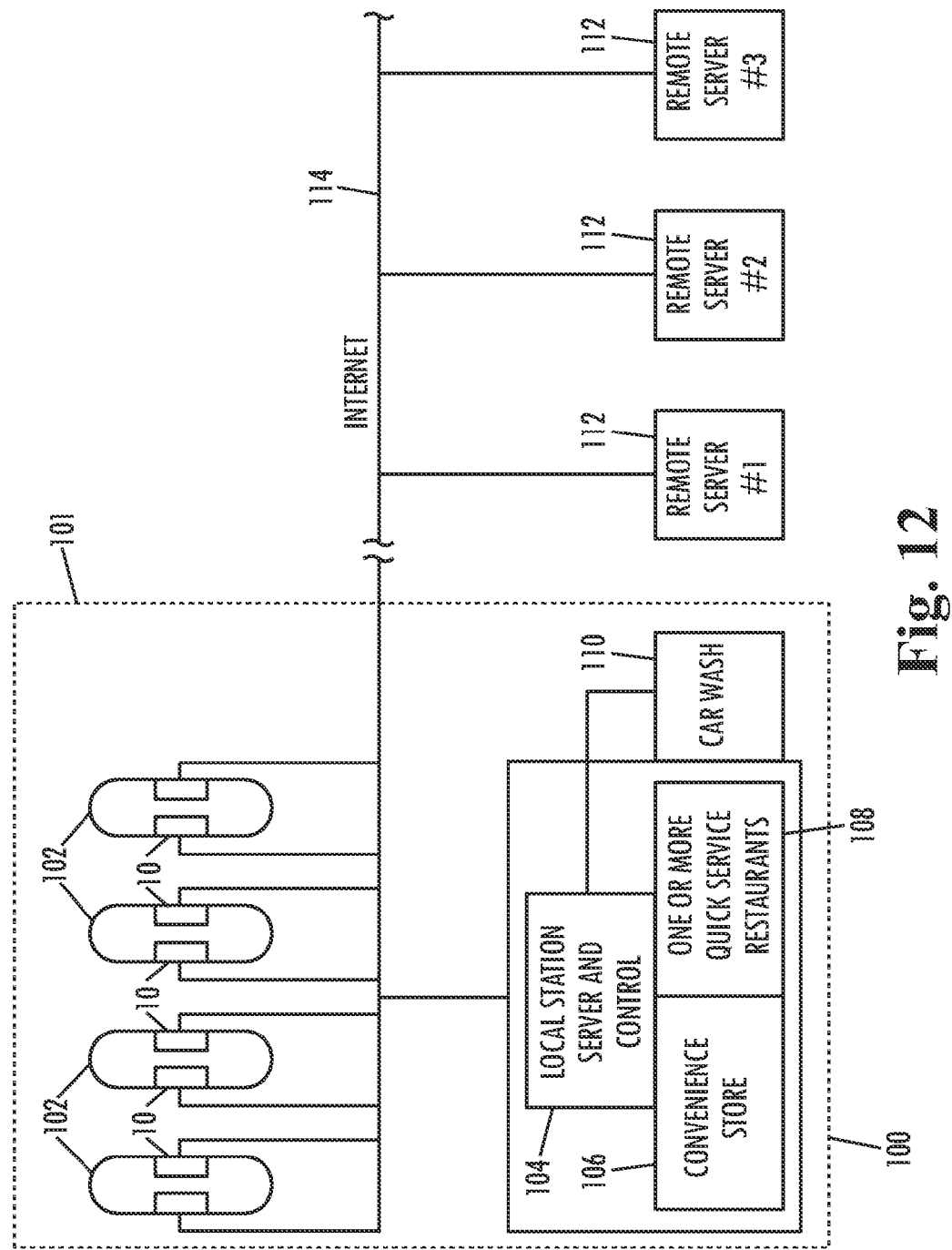
FIG. 12 is a schematic view of a fueling station in accordance with an embodiment of the present invention.

Each display may include its own control system or operate in conjunction with a single control system adapted to operate both displays on a single side of the dispenser. Additionally, the control system may also be configured to operate the displays associated with each side of the dispenser. In a preferred configuration, each dispenser 10 acts as client capable of interacting with a network of servers. Controller 32 and associated user interfaces are preferably designed to minimize the hardware commitment necessary at each dispenser, while having sufficient capability to establish interactivity with the user. Most computer intensive functions are provided as services from various local 104 and remote servers 112 (FIG. 12).

Although certain functions and services may be run at the dispenser, most functions dealing with customer transactions, information dissemination and advertising or merchandising are preferably performed as services performed remotely and accessed by dispenser 10. The browser software for each client has the ability to request services either locally or remotely, via the Internet or similar network. Certain services may be automatically requested by the browser at each dispenser, while others await responses by a customer. One example of a distributed fuel dispenser system is disclosed in U.S. Pat. No. 6,052,629 entitled "Internet Capable Browser Dispenser Architecture" assigned to Gilbarco Inc., the entire disclosure hereby being incorporated by reference herein, which describes an interactive fuel dispenser system having a graphical interface through which a customer interacts with the dispenser. Because the dispenser is Internet capable, the majority of the computing power is centralized and the dispenser need only connect to the remote severs where the information is stored and processed.

Figure 6:
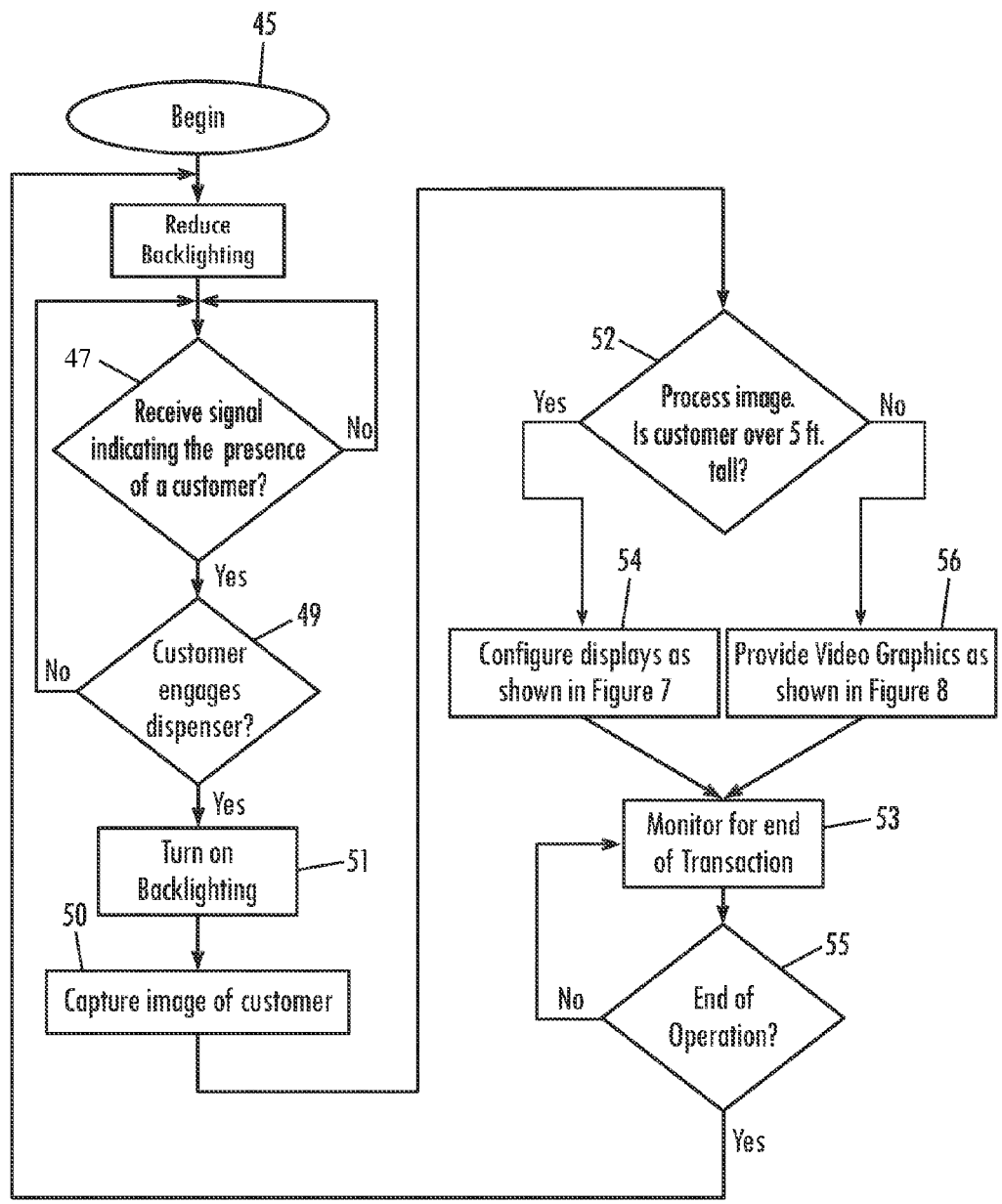
FIG. 6 is a representation of suitable graphics for one embodiment of the present invention for display by the dispenser of FIG. 1.
Figure 7:
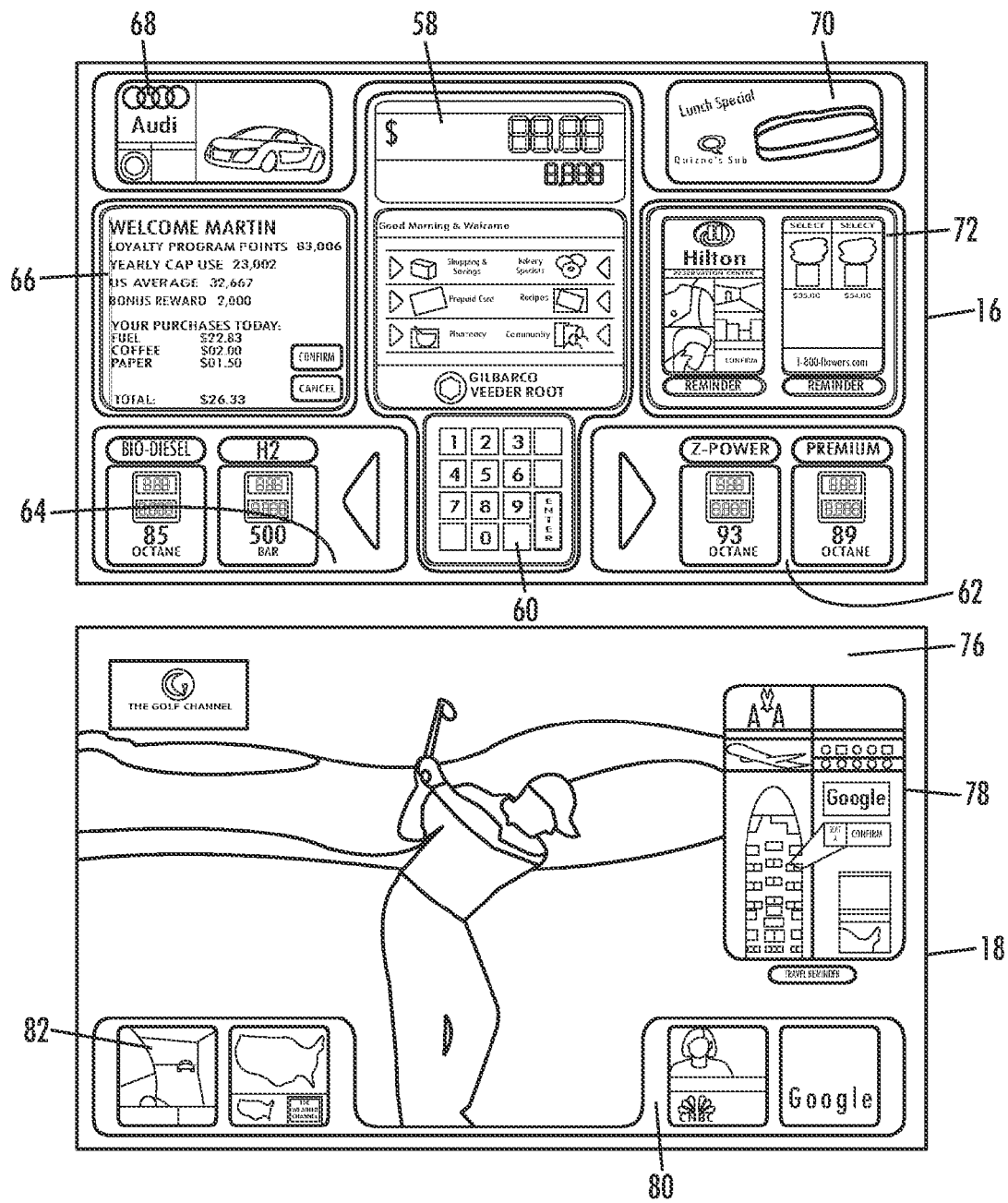
FIG. 7 is an illustration of displayed information for the dispenser of FIG. 1.

Referring to FIG. 6, fuel dispenser 10 uses one or more of touch display screens 16 and 18, camera 24 and proximity sensor 48 to detect the presence of a customer at the dispenser. At step 45, the process begins by controller 32 causing control light circuit 40 to reduce the backlighting of displays 16 and 20 when a customer is not detected. At step 47, once the presence of a customer is detected, controller 32 monitors the dispenser input devices to determine if a customer engages the dispenser at step 49. If a customer engages the dispenser, controller 32 causes control light circuit 40 to turn on the display backlighting at step 51 and camera 24 to capture a picture of the customer, at step 50. At step 52, controller 32 activates a video recognition program stored in memory 34 to process the customer's image data captured by camera 24 to determine certain characteristics of the customer. If the customer meets certain characteristics, for example is greater than five feet tall, then controller 32 configures displays 16 and 18, at step 54, as shown in FIG. 7. Otherwise, displays 16 and 18 are configured, at step 56, as shown in FIG. 8.

A video recognition software program uses images captured by camera 24 of the customer and analyzes the images using conventional digital imaging techniques to determine certain characteristics of the customer, for example the height of the person standing proximate to dispenser 10. Captured images may also be used by facial recognition software to determine the identity of the customer for authorizing a transaction. One example of suitable facial recognition software is FaceIntellect manufactured by ITV Group of New York, N.Y. However, it should be understood that many other suitable facial recognition software programs may be used to identify customers and associate customer preferences and customer specific information with their identities.

Figure 8:
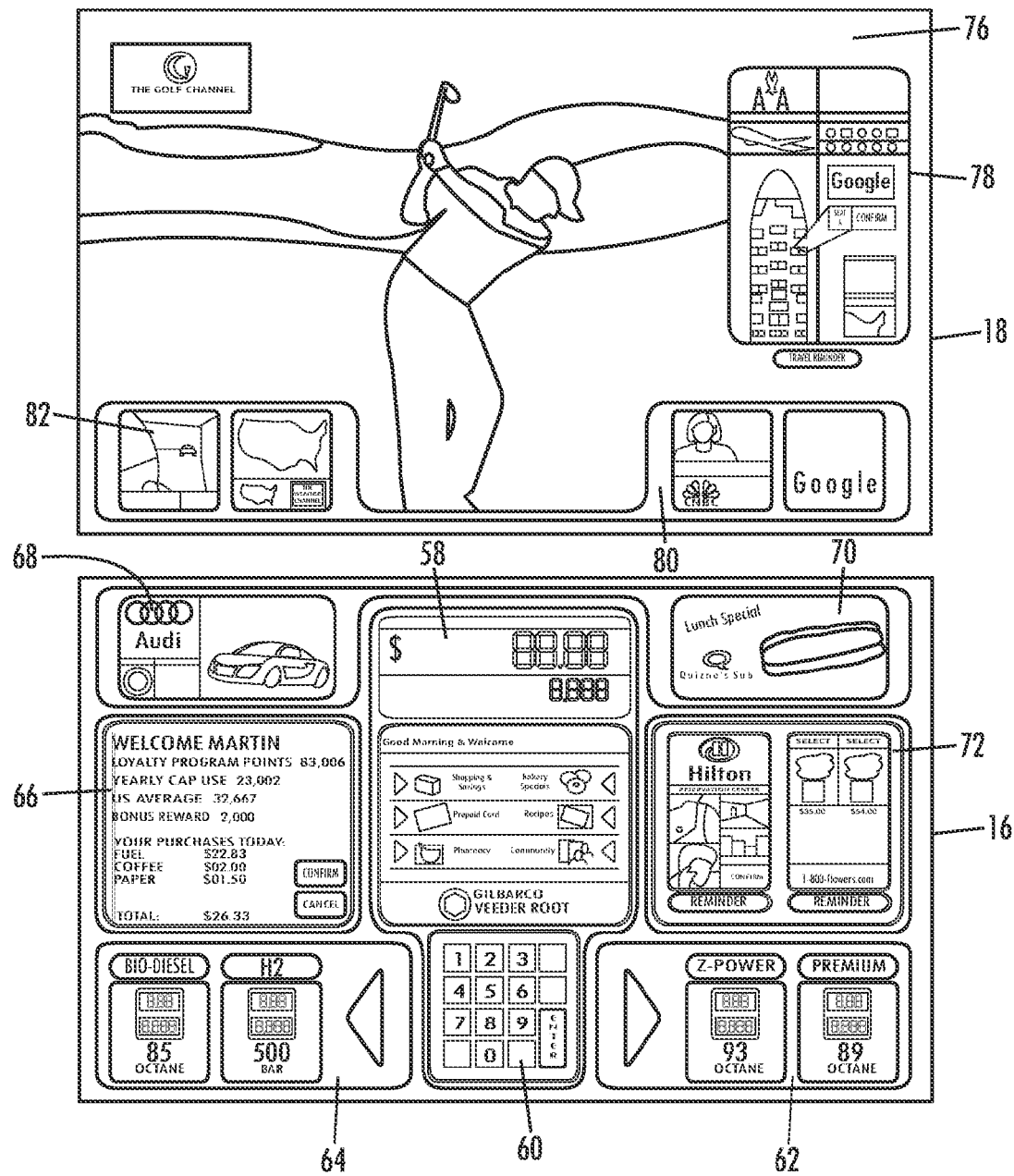
FIG. 8 is an illustration of displayed information for the dispenser of FIG. 1.

Referring to FIGS. 7 and 8, display screens 16 and 18 are illustrated showing exemplary subject matter that may be displayed to the customer. Referring specifically to FIG. 7, displays 16 and 18 are configured to display information to, for example, a person over the height of five feet tall. That is, the details of the particular transaction are displayed at 58, a touch keypad at 60 and the product selector keys 62 and 64 are all displayed on top display 16 at a height suitable for a customer over five feet tall. In addition to the transaction details, a loyalty screen 66 and advertisements 68 and 70 are displayed in accordance with either the customer's preferences or with products that are available at the station. It should be understood that the advertising can also contain subject matter related to advertising by third party vendors not affiliated with the service station.

In addition to transaction information and advertising, the display may also be configured to display reminder information 72 relevant to the customer, for example a spouse's birthday as well as reminders to make a hotel reservation for the event. Finally, a central shopping and information window 74 may be displayed that allows the customer to choose particular grocery items and general information. Display 18 may be configured to display a television channel 76 based on predefined customer preferences. In addition, a media center bar 80 may be positioned at the bottom of the screen to allow the customer to quickly switch between channels of interest. At 78, information about the customer's lifestyle, for example travel plans may be displayed. Finally, at 82, a closed circuit television may display the fueling area so that the customer may focus their attention on displays 16 and 18 and not on their surroundings.

Referring to FIG. 8, if dispenser 10 detects the presence of a customer under a predetermined height, for example five feet tall, the dispenser automatically reconfigures the information displayed on displays 16 and 18 to place interactive information in a position that is easily reachable for customers of smaller stature or wheel chair bound. Thus, as shown in the figure, touch pad 60 and product selection panels 62 and 64 are moved to the bottom of display 16 so that these panels are easily reachable by the customer. Once the customer enters the necessary information to authorize a transaction and a product is selected, the system can dynamically reconfigure the information back to that shown in FIG. 7. In the alternative, the system may be set up to allow the user to touch a portion of the screen to cause the information to reconfigure itself back to that shown in FIG. 8. Because information is displayed on two touch screens, using software the information can be displayed in a variety of layouts and configurations where certain information is placed in an easily accessible location when it requires immediate input.

Still referring to FIGS. 7 and 8, a customer's preference may be used to populate the information on displays 16 and 18. In particular, there are multiple patents describing dispensers that incorporate customer preference and loyalty programs in the presentment of information at a dispenser. For example, U.S. Pat. Nos. 6,098,879 and 6,422,464 both entitled "Fuel Dispensing System Providing Customer Preferences" and both assigned to Gilbarco Inc., the entire disclosures hereby being incorporated by reference herein, describe a fuel dispenser that automatically provides predefined customer preferences during fueling based on information contained on a transponder. Preferences are typically selected by a customer and associated with the transponder assigned to the customer. In yet another example, U.S. Pat. No. 6,813,609 entitled "Loyalty Rewards for Cash Customers at a Fuel Dispensing System" assigned to Gilbarco Inc., the entire disclosure hereby being incorporated by reference herein, describes a system for providing loyalty rewards for cash customers by providing a transponder that associates predefined preferences with a cash customer.

Each of the above Gilbarco, Inc. patents describes systems that allow customer preferences to be recognized by a fuel dispenser. It should be understood to those of skill in the art that user preference can also be predefined and tied to a customer's credit card number, customer loyalty number or any other user identification that can be read or accepted by fuel dispenser 10. For example, if reader 20 includes a fingerprint or retina scanner, user preference can be tied to these identifiers such that when a customer identity is determined by a fingerprint scan, the user's preferences are downloaded by fuel dispenser 10 and used to populate the information presented on displays 16 and 18. In other embodiments for example, a customer may have an identification code, an electronic device such as a BLUETOOTH enabled phone or other device that allows the identity of the customer to be obtained so that the fueling experience is tailored to that specific customer.

In addition to using the customer's height information to adjust the presentation of information on displays 16 and 18, controller 32 may also adjust the viewing angle of the displays 16 and 18 by monitoring the video image of the customer and calculating the relative customer location based on the received image. Once the customer's general location is detected or determined with respect to the dispenser, controller 32 may change the video/graphic display, change backlighting levels, and preferably adjust the viewing angle based on customer location. In addition to the methods described above for changing the viewing angles of the displays, the viewing angle may be mechanically adjusted by mounting small servo motors to the back of displays 16 and 18 that move the displays accordingly to optimize the viewing angle. Controller 32 may continue to monitor the customer's location throughout the fueling operation, and if a change in location is detected, controller 32 will determine whether the fueling operation is at an end. The end of a fueling operation may be determined by sensing the nozzle handle being pulled down (through the use of accelerometers located in the nozzle as explained below), detecting the placement of the nozzle back into the dispenser, or sensing the end of fuel delivery. When the end of a fueling operation is detected a different video message may be displayed alone or in conjunction with audio messages.

Figure 9:
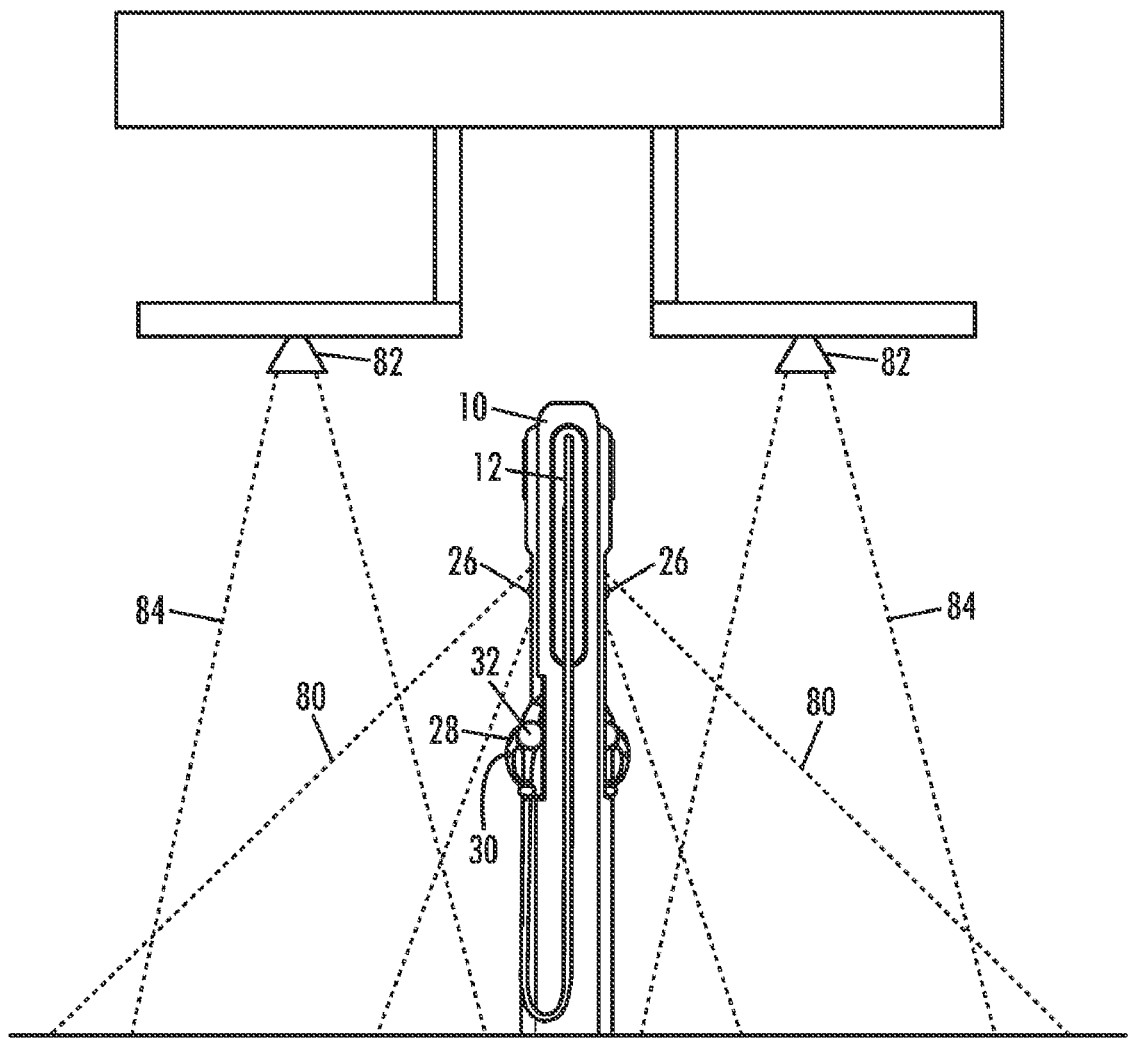
FIG. 9 is a plan view of a fueling station in accordance with an embodiment of the present invention.

In another embodiment of the present invention shown in FIG. 9, speaker 26 may consist of one or more highly directional speakers. Highly directional speakers are ideal in audio applications that require focused, high quality sound over long distances, as for example in a fueling environment where ambient noise can interfere with the customer's ability to hear messages presented by the dispenser. Additionally, in prior art systems, cross talk between dispensers either interfered with adjacent dispensers or allowed other customers to hear customer specific information provided over the speaker to another customer. Thus, the use of highly directional speakers reduces sound interference between adjacent dispensers and allows sound to be directed over a narrow cone 80 to the specific customer operating dispenser 10. Examples of suitable highly directional speakers are SOUND SHOWER and AUDIO ELEMENTS speakers manufactured by Panphonics Oy of Espoo, Finland. For example, the Panphonics AUDIO ELEMENT is a flat plane wave type speaker that is designed to be used as an integrated component of dispenser 10. In addition to an integrated speaker, the SOUND SHOWER speakers are adapted to be mounted above the dispenser on a structure of the fueling bay.

In some embodiments, camera 24, as described above, may be used to determine the proximate location of the customer with respect to dispenser 10. By using this information, the direction of sound from speaker 26 may be adjusted. In particular, speaker 26 may be mounted on one or more servo motors that are configured to adjust the direction of speaker 26 by angling the speaker in the direction of the customer. Thus, as the customer moves around dispenser 10, controller 32 determines the approximate location of the customer and adjusts the direction of speaker 26 accordingly. In other embodiments, a SOUND SHOWER speaker system 82 may be mounted above dispenser 10 either in conjunction with, or instead of, the AUDIO ELEMENTS speakers so that the sound is directed over a narrow span 84 directly in front of dispenser 10. In this configuration, it would not be necessary to move the speaker as the customer moves around the dispenser.

Figure 10:
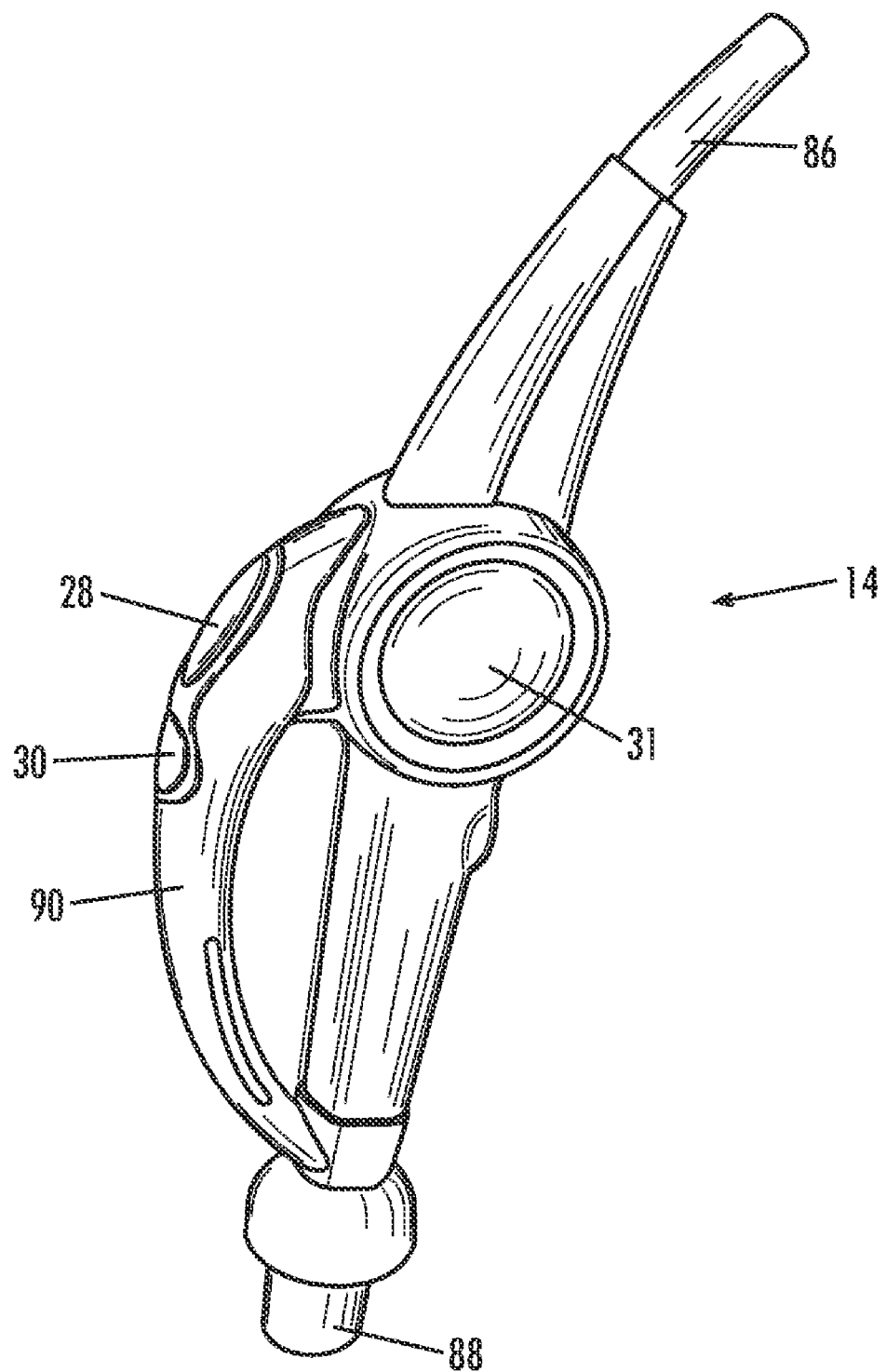
FIG. 10 is a perspective view of a nozzle in accordance with an embodiment of the present invention.

Referring to FIG. 10, nozzle 14 has a first end 86 configured to fit into the fuel opening of an automobile and a second end configured to attach to fuel delivery line 12. A fingerprint reader 30 may be positioned on a handle 90 to allow the customer to be identified without having to enter data on dispenser touch screens 16 and 18. It should be understood that fingerprint reader 30 may be replaced with any suitable input device that allows the customer to enter data linking the customer to an account for payment or authorization of the transaction. In addition to authorizing the transaction, the information may also link certain preferences or data to be displayed on displays 16 and 18. In addition to reader 30, a fueling button 28 may be positioned on handle 90 in an ergonomic position to allow the customer to easily cause fuel to be dispensed. Fueling button 28 may be a clear button that illuminates red or green to indicate to the user that the dispenser is ready for fueling. In the alternative, other light indicators may be mounted in nozzle 14 to indicate the status of the dispenser. Additionally, the lighted button may flash when the nozzle senses that the car's tank is almost full. Sensing that the tank is full may be carried out in many ways. For example, nozzle 14 may include sensors to detect the fuel level in the tank or dispenser 10 may receive a signal from the car's electronics that indicates the fuel tank size and/or the amount of gas necessary to fill the tank. In the alternative, nozzle 14 may be equipped with a barcode reader or RFID reader that obtains information from a barcode or RFID tag located proximate to the fueling opening for obtaining fueling information for the specific car.

As mentioned above, nozzle 14 may include a position sensor to determine movement of the nozzle with respect to a reference point or plane. One such sensor includes an internal position, attitude or orientation sensor that can sense the position, attitude and/or orientation of the controller relative to the earth's gravitational force. Such a sensor may for example comprise a 3-axis accelerometer that can sense orientation (or changes in orientation) of nozzle 14 relative to the direction of earth's gravitational pull. Examples of accelerometers may be of the type available from Analog Devices, Inc. or STMicroelectronics N.V. Preferably, the accelerometer is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used.

Figure 11:
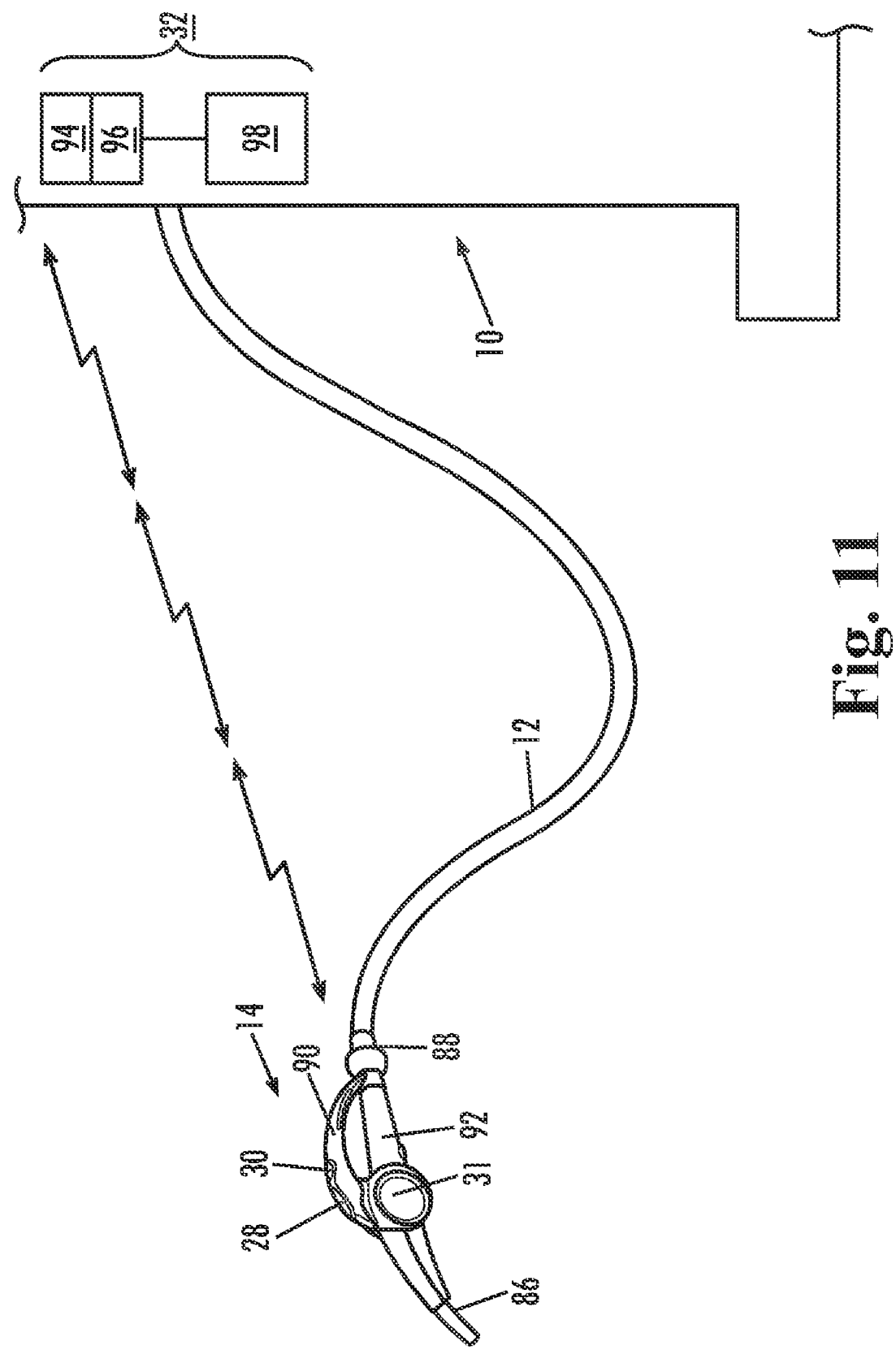
FIG. 11 is a perspective view of a dispenser in accordance with an embodiment of the present invention.

Referring to FIG. 11, the output of the accelerometer may be received by controller 32 and used for example as an input device for dispenser 10. For example, when a customer first pulls up to dispenser 10, one of displays 16 and 18 may include graphics representative of a keyboard or input buttons and the other of the displays may provide instructions telling the customer to point the nozzle toward the screen and to move the nozzle similar to a pointer toward the buttons without touching the screen. In making these movements, dispenser controller 32 can read output signals from the accelerometer to determine the relative position of nozzle 14 with respect to the input keys. Software algorithms of conventional design can be used with output signals from the accelerometer(s) to provide rough (x, y, z) position information in three dimensions of the nozzle. Such relative position information (or signals from which it can be derived) can be communicated to dispenser 10 and used to control input requested on displays 16 and 18. Thus, customer input may be detected though movement of nozzle 14 so that a transaction can be carried out without the customer ever having to touch the screens. Furthermore, once fuel has started to be dispensed, controller 32 can ignore output from the accelerometer with respect to the displays and monitor the accelerometer output for a quick change in nozzle position or orientation, alone or in combination with other signals, indicative of the end of the fueling process.

Information obtained from nozzle 14, through reader 30, fuel button 28, the position sensor (accelerometer), etc. may be communicated to controller 32 either by hard wire through fuel supply line 12, radio waves, electromagnetic waves, BLUETOOTH technology or any other suitable wireless technology. That is, nozzle 14 may have a transmitter, receiver or transceiver mounted within the nozzle that transmits information to dispenser 10. In the case of a wireless connection, dispenser 10 would be equipped with one or more of a transmitter 94, receiver 96 or transceiver for transmitting and receiving information to and from nozzle 14. The communication link between the nozzle and the dispenser should allow for bi-directional data transmission and reception.

Nozzle 14 may also contain a suitable power source 92 with or without a battery for powering the various sensors, transmitter, receiver, transceiver, etc. contained in the nozzle. Nozzle 14 may also include recharging circuitry and optional energy coupling electronics to aid in recharging the power source, i.e. battery. Energy may be electromagnetically coupled to nozzle 14 from a transformer 98 located at or near the fuel dispenser. Preferably, recharging using the electromagnetically-coupled energy occurs when the nozzle is mounted in the dispenser. The power supply 70 may also be associated with an energy coupling system 82 adapted to provide remote power to the nozzle, if necessary, in order to power the electronics or recharge batteries. The coupling may be a direct electrical connection or an electromagnetic or optical connection as disclosed in U.S. Pat. Nos. 5,184,308 and 5,365,984, both to Simpson et al., the entire disclosures of which are incorporated herein by reference.

Nozzle 14 may also contain an ant-bacterial or anti-microbial coating on handle 90 to prevent or eliminate the growth of bacteria or microorganisms that can be transmitted from one customer to another. For example, handle 90 may include an antimicrobial component in the form of an antimicrobial material integrally formed with or coated on the handle. The material forming handle 90 may be an antimicrobial material itself, or it may be a structural material impregnated or blended with an antimicrobial material. The antimicrobial material may also be chemically bound to the structural material, such as, for example, a polymer matrix having an antimicrobial material bound or complexed thereon.

In the form of coating, the coating may be connected to handle 90 by a number of means, such as, for example, interference fit, snap fit, mechanically fastened, or overlaid onto the handle. Coatings may applied by numerous techniques, including chemical vapor deposition, physical vapor deposition, dip coating, electrochemical deposition, sputtering, mechanical methods of coating, or the like.

In other embodiments, the antimicrobial component may comprise an active oxygen releasing material, active ozone, UV light, Halide gas, silver ion, or Halide ion releasing material, an antimicrobial fluid, or a photoactive material that exhibits antimicrobial properties when exposed to a light source. Materials may include a nonmetal halide; a nonmetal oxide, such as I2O5; a ceramic composite and a halide; water insoluble peroxide; or water insoluble superoxide, such as CuO, AgO, MgO2, sulfonated silver polymers, and combinations thereof. Other embodiments are contemplated wherein the antimicrobial material comprises an active ozone releasing material, a UV light releasing material, a Halide gas releasing material, a silver ion releasing material, a Halide ion releasing material, or any other material, compound or combination thereof capable of releasing an antimicrobial agent or exhibiting antimicrobial properties. The light source 34 may be separate from, or integrated with handle 90. In one embodiment, the light source may be in the form of an LED integrated into handle 90 such that, when the LED is illuminated, antimicrobial properties are imparted to the handle 32 by the photosensitive material being exposed to the light from the LED.

In other embodiments, an antimicrobial handle 90 may be provided wherein the antimicrobial component includes an ion generator in the form of an ionic conducting arrangement in communication with handle 90. In this arrangement, antimicrobial properties are imparted to handle 90 via generation of ions through ionic conduction, wherein ions concentrate on a surface of handle 90. Ionic conducting materials suitable for this arrangement may include Ag4PbI5, AgI—Al2O3 composite, PbI2 chloride conductive compounds, iodine conductive compounds, fluoride conductive compounds, or any other material, compound or combination of materials or compounds capable of ionic conduction. Ionic conduction is facilitated by a source potential that is preferably integrated into handle 90. The source potential may also be a component separate from handle 90 and in communication therewith. Other forms of ion generators known in the art can be implemented as well in accordance with the principles of the present invention to facilitate generation of ions to impart antimicrobial properties to the handle 90.

Referring to FIG. 12, the fueling and retail environment is shown constructed according to one embodiment of the present invention where customers are provided the opportunity to purchase fuel for their vehicles as well as other goods and services, such as fast food and car washes. The fueling and retail environment may include one or more of a forecourt 101, where fuel dispensers 10 are located, a convenience or fuel station store 106, one or more quick-serve restaurants (QSR) 108 and a car wash 110. Dispensers 10 are used in conjunction with a main service station store 100 operably connected to each dispenser 10 and fueling position 102 in addition to a local station server and control system 104. Server and control system 104 are operationally associated with POS systems and/or transaction systems for convenience store 106 and one or more quick service restaurants 108 and car wash 110 or other service provider. In one preferred embodiment, a customer at any of fueling positions 102 of any of dispensers 10 may access local station server 104 or any number of remote servers 112, which are located outside of the fuel station environment, via the Internet or similar network 114. Dispenser 10 may have a direct Internet connection and/or a direct interactive connection to local server 104.

With regard to remote services, customers may be given the opportunity to order goods or services unavailable at the local station store, such as movie tickets, air line tickets, rental cars, hotel information and other informational items. This is particularly useful for dispensers equipped with printers that can print the movie ticket or other printed information. Furthermore, the customer may download information, such as the weather, traffic conditions, news reports or local maps that can be printed or downloaded to mobile devices such as a cell phone, iPod or MP3 player. Having access to remote services also allows the station owner to run remote advertising campaigns at each fueling position. For example, the browser at each client may automatically access one of the remote servers or preferably, the dispenser may be configured to automatically access local server 104, which provides a link to the desired remote services. Accessing local server 104 and linking to remote services minimizes the amount of customization required at each dispenser and fueling position.

Convenience store 106 typically includes an inventory of a wide assortment of products, ranging from beverages and foods to household goods. The convenience store includes a transaction terminal or register where a customer may purchase convenience store products, fuel, car washes or QSR food. QSR 108 generally includes an order pick-up area having a QSR transaction terminal or register located within the convenience store and a drive-through terminal and window. Depending on the application, the QSR transaction terminal and drive-through terminal may be separated or integrated in any fashion. Usually, customers are able to place orders at the QSR transaction terminal in the store as well as pick up orders in conventional drive-through style at drive-through terminal 36.

In order to make purchasing items in convenience store 106 and QSR 108 more convenient for the customer, dispenser 10 may be configured to provide a real-time view of the convenience store or QSR on one or more of dispenser displays 16 and/or 18. In particular, referring again to FIG. 7, menu 74 may allow the customer to place dispenser 10 into a real-time shopping mode where the customer can navigate down the isles of convenience store 106 to select and purchase products while fueling their automobile. In particular, cameras can be mounted throughout the convenience store and configured so that their video feed is received by local station server and control electronics 104. Thus, by using touch screens 16 and 18, the customer can navigate through the convenience store, make selections and pay for the items at the dispenser.

In one embodiment, predefined hand gestures can be programmed and loaded on local station server and controller 104 or on dispenser 10. For example, a gesture dictionary may take the form of a dedicated computer application that identifies a chord (e.g., a combination of fingers, thumbs, and/or other hand parts) presented to multi-touch displays 16 and 18 by the customer. Thus, for example, the movement of the customer's thumb and pointer finger toward each other may cause the displayed image to zoom out, or the movement of the thumb and pointer finger away from each other may cause the image to zoom in. Additionally, running the customer's pointer finger from right to left may cause the image to scan to the left or vis-à-vis. If the user wants to scroll around to look at the shelves behind them, the user may rotate their pointer finger on the screen in a counterclockwise direction to cause the image to rotate as if the customer was standing in the store and turning around. Examples of such gesturing as input on a touch screen is taught and disclosed in the following patents, patent applications and published patent applications: U.S. Published Application No. 2007/0177803 entitled "Multi-Touch Gesture Dictionary," published Aug. 7, 2007, U.S. Pat. No. 6,323,846, titled "Method and Apparatus for Integrating Manual Input," issued Nov. 27, 2001; U.S. patent application Ser. No. 10/840,862, titled "Multipoint Touchscreen," filed May 6, 2004; U.S. patent application Ser. No. 10/903,964, titled "Gestures for Touch Sensitive Input Devices," filed Jul. 30, 2004; U.S. patent application Ser. No. 10/038,590, titled "Mode-Based Graphical User Interfaces for Touch Sensitive Input Devices," filed Jan. 18, 2005; U.S. patent application Ser. No. 11/367,749, titled "Multi-Functional Hand-Held Device," filed Mar. 3, 2006; and U.S. Pat. No. 7,030,861, titled "System and Method for Packing Multi-Touch Gestures onto a Hand," issued Apr. 18, 2006. U.S. published application Ser. No. 2007/0177804, titled "Multi-Touch Gesture Dictionary," published Aug. 2, 2007, the entire disclosure of each of these patents, patent applications and published patent applications hereby being incorporated by reference herein.

Once the customer completes their fuel purchase and purchase from the convenience store or QSR, the customer may either enter the store to pick up their items, pick up their purchased items at a drive through window or have their purchase delivered by an employee of the convenience store or QSR to the dispenser location. It should be understood that the dispenser system may be tied into the inventory system for the convenience store and CSR so that sales can be tracked and inventory reordered as sold.

In other embodiments, the fueling stations local server can be tied into a remote system that detects the presence of an automobile entering the service station forecourt. Upon detection of the automobile, the system can interact with the automobile's electronic systems to take control of the automobile so as to bring the car to an available dispenser location. New automobiles with a drive-by-wire system would allow for remote operation and steering of the car without input from the customer. For example, the parallel parking system in the Lexus LS460 is one example of a drive by wire system where the car's electronic system takes over operation of the car to automatically parallel-park the car in a vacant spot. In a similar fashion, wireless electronics can be configured to communicate with the car's computer so that a smart service station can orchestrate the movement of cars through the forecourt to increase the safety of its customers walking through the forecourt.

In addition to the remote operation of cars entering and exiting the service station through the use of the car's drive-by-wire system, the dispenser may also be configured to interact with the automobile's electronic system so that a touch screen mounted in the car can serve as a touch sensitive input display for the dispenser. For example, through RF communications, a BLUETOOTH connection or any other suitable wireless connection, information from the dispenser may be transmitted and displayed by the car's electronic system so that the customer may make all selections from the comfort of their automobile. In addition to displaying the transaction detail and information, advertising and other services may also be transmitted and displayed on the car's touch screen system. In other embodiments, the fuel dispenser may contain a robotic arm that is controllable using the car's touch screen so that the total fueling process can be controlled from inside the automobile. Thus, nozzle 14 may further include a camera integrated into the nozzle that allows the customer to view the fueling port in the car as the nozzle is directed toward the fueling port. Once the nozzle is inserted into the fueling port, the dispenser can switch modes and transmit advertising or other information to the car's touch screen for interaction with the customer. The use of a robotic arm can also be integrated into an automated service station where the car is remotely moved into a dispenser bay. In that way, the service station can properly orient the car with respect to the dispenser so that predefined fueling port locations for individual automobiles would allow the fueling arm to automatically engage the nozzle with the fueling port on in the car.

Figure 13:
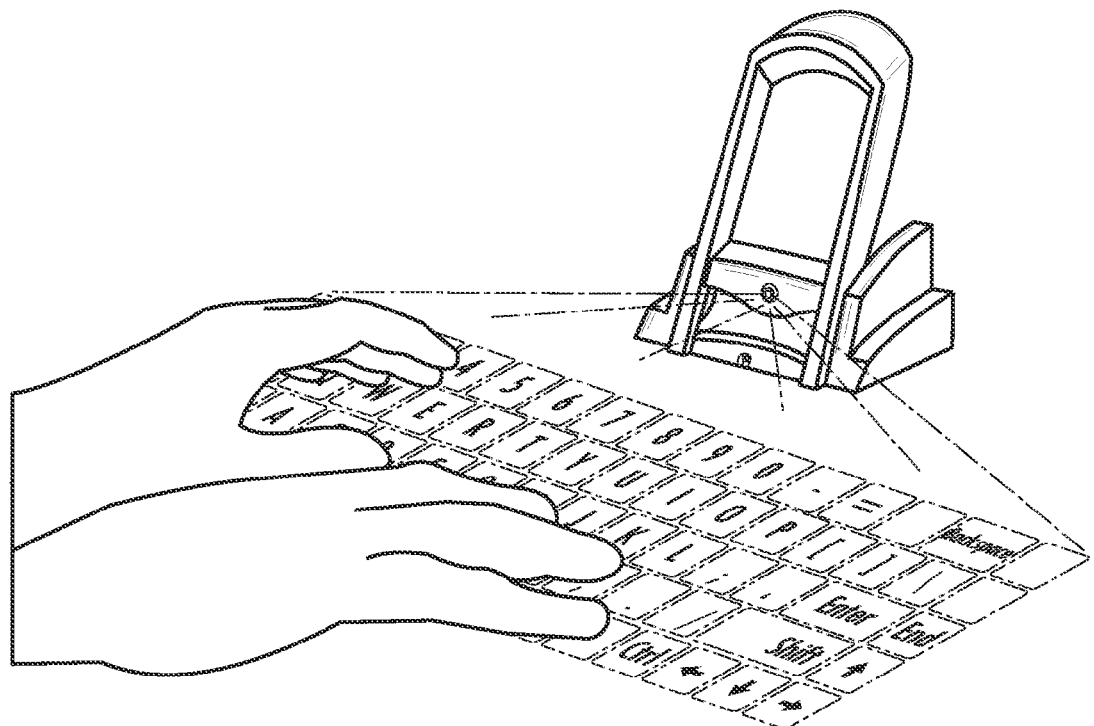
FIG. 13 is a perspective view of a virtual input device for use in an embodiment of the present invention.
Figure 14:
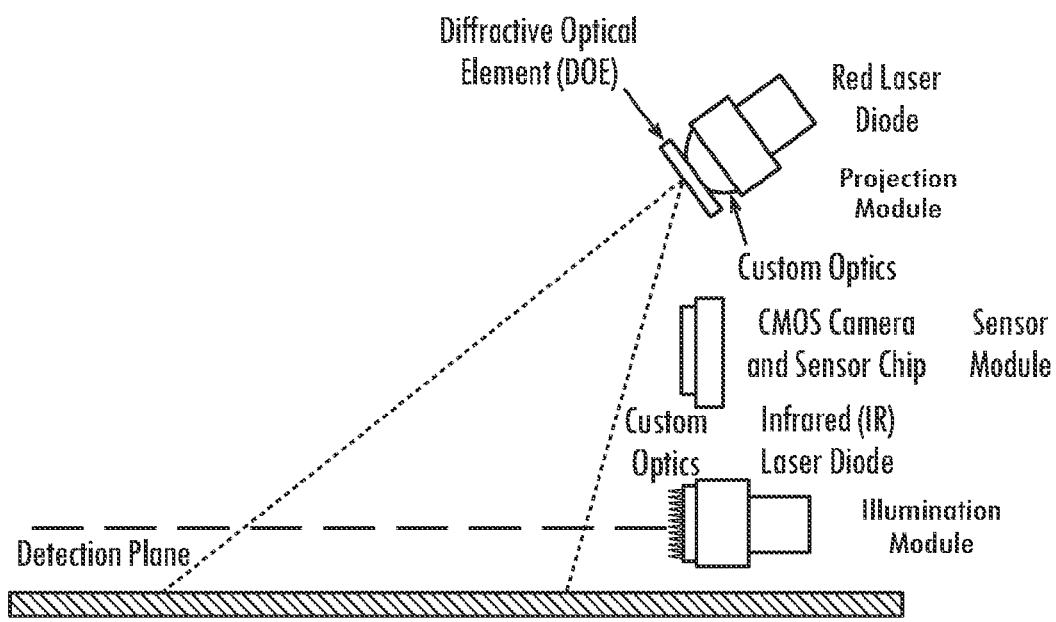
FIG. 14 is a schematic view of the virtual input device of FIG. 13.

In other embodiments, a virtual display system may be implemented in dispenser 10. Referring to FIGS. 13 and 14, virtual display systems project a keyboard or other input device into the air or onto another surface and then monitor the virtual keyboard for a user's touch of the virtual keys to detect the customer's desired input. For example, a laser system may be used that is capable of both scanning and projecting laser light onto a surface that is secure with respect to viewing angle. Based on initial input provided by the customer either directly into dispenser 10 by reader 20 or indirectly by a wireless connection, the laser system and software would dynamically present the required virtual key layout based on the type of transaction, user preferences, ease of use, or other pre-defined parameters. The laser would be capable of projecting and auto focusing so that it can simultaneously project on a number of surfaces with varying levels of distance, content, and required resolution, for example on the car window, door panel or any other surface capable of receiving the projected laser light.

In one example, when a debit card is presented, the card reader recognizes the need for pin pad verification and sends a signal to the laser device. The laser device, through software, projects an appropriate keyboard for the user to input data such as a pin number. The location and distance of the projection surface may be at a fixed distance so that the laser projector does not require focusing or may be presented at any distance within a reasonable range over which a focusing mechanism can focus the laser output. If the surface that receives the projected light is polarized, then it may limit viewing of the projected input device at certain angles to provide a secure input terminal with respect to customers at adjacent dispensers. If however, the surface receiving the projected keyboard is not polarized, the system can be configured to randomly change the layout of the projected input device to provide further security to those who may be passing by.

In addition to projecting a keypad for data entry for payment information, the laser system can also project options to begin or initiate the transaction (such as pay outside/inside/Credit/Debit/Withdrawal/Deposit), etc. In the example of a fuel dispenser, the laser system could project the grade selection buttons for selection by the customer. The pump stop, handicap, call attendant, programmable pump preset button, etc. could then be presented essentially acting as a substitute for all existing keypads and/or touch screen menus. The use of a virtual keyboard or input device reduces or eliminates the need for the customer to have to physically touch the dispenser screens or keypads.

Examples of virtual input devices are disclosed in U.S. Pat. No. 7,084,857 to Lieberman et al., entitled "Virtual Data Entry Device and Method for Input of Alphanumeric and Other Data," U.S. Pat. No. 6,690,357 to Dunton et al., entitled "Input Device Using Scanning Sensors," U.S. Pat. No. 6,614,422 to Rafii et al., entitled "Method and Apparatus for Entering Data Using a Virtual Input Device," the entire disclosures of which are hereby incorporated by reference herein. Additionally, suitable virtual input devices also include virtual input devices manufactured by Virtual Devices, Inc. of Allison Park, Pa. and Lumio, Inc. of Menlo Park, Calif.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed:

1. A fuel dispenser comprising:
   a. a housing;
   b. a fuel dispensing apparatus mounted within said housing;
   c. control electronics operatively connected to said fuel dispensing apparatus;
   d. at least one display mounted in said housing and operatively coupled to said control electronics;
   e. a nozzle operatively coupled to said fuel dispensing apparatus and said fuel dispensing apparatus control electronics, said nozzle configured to produce electromagnetic signals
      wherein said dispenser is configured to provide an electronic indication when said nozzle is brought into close proximity to said at least one display.

2. The fuel dispenser of claim 1 further comprising a detector mounted in said housing, said detector being operatively coupled to said control electronics and configured to detect the presence of said nozzle when said nozzle is brought into close proximity to said at least one display.

3. The fuel dispenser of claim 2, wherein said close proximity occurs when said nozzle is brought within six inches of said at least one display.

4. The fuel dispenser of claim 2, wherein said detector receives said electromagnetic signals transmitted by said nozzle.

5. The fuel dispenser of claim 1, wherein said display contains touch electronics that are configured to detect the presence of said nozzle when said nozzle is brought into close proximity to said at least one display.

6. The fuel dispenser of claim 1, wherein said display is turned off when said electronic indication is triggered.

7. The fuel dispenser of claim 6, wherein said electronic indication causes an audible alarm to play.

8. The fuel dispenser of claim 4, said nozzle further comprising a power source for generating said electromagnetic signals.

9. The fuel dispenser of claim 8, wherein said power source is charged when said nozzle is stored in said housing between dispensing transactions.

10. The fuel dispenser of claim 1, said nozzle containing an antimicrobial coating.

11. The fuel dispenser of claim 1, wherein said at least one display is dynamically configurable to simultaneously display a combination of two or more of transaction data, advertising data, loyalty program data, an internet browser and a TV broadcast.

12. A fuel dispenser comprising:
    a. a housing;

b. a fuel dispensing apparatus mounted within said housing, said fuel dispensing apparatus having control electronics;

c. at least one touch display mounted in said housing and operatively coupled to said control electronics, said touch display being configured to allow a user to make inputs for conducting a transaction;

d. a nozzle operatively coupled to said fuel dispensing apparatus; and e. a detector operatively configured to detect said nozzle, wherein said fuel dispensing apparatus control electronics triggers an electronic indication when said nozzle is brought into close proximity to said touch display.

13. The fuel dispenser of claim 12, said nozzle containing an antimicrobial coating.

14. The fuel dispenser of claim 12, wherein said electronic indication causes said fuel dispenser apparatus control electronics to blank out said at least one touch display to prevent the user from making inputs using said nozzle.

15. The fuel dispenser of claim 12, wherein said detector is a camera that generates images that are used to determine when said nozzle moves within a predetermined distance from said at least one touch display.

16. The fuel dispenser of claim 12, wherein said at least one touch display is dynamically configurable to simultaneously display a combination of two or more of transaction data, advertising data, loyalty program data, an internet browser and a TV broadcast.

17. The fuel dispenser of claim 15, wherein said camera is also used to track the approximate location of the user with respect to said fuel dispenser.

18. The fuel dispenser of claim 15, wherein said camera captures an image of the user to determine the identity of the user.

19. The fuel dispenser of claim 18, wherein the user identity is used to configure the information and graphics presented on said at least one touch display.

20. The fuel dispenser of claim 19, wherein said configuration of information and graphics comprises at least one of changing a viewing angle of said display, changing a background color, changing a size of font, changing a polarization of said at least one touch display and changing a brightness of said at least one touch display.

* * * * *